B. WICH.
NUT LOCK.
APPLICATION FILED MAY 3, 1912.
1,055,961.
Patented Mar. 11, 1913.
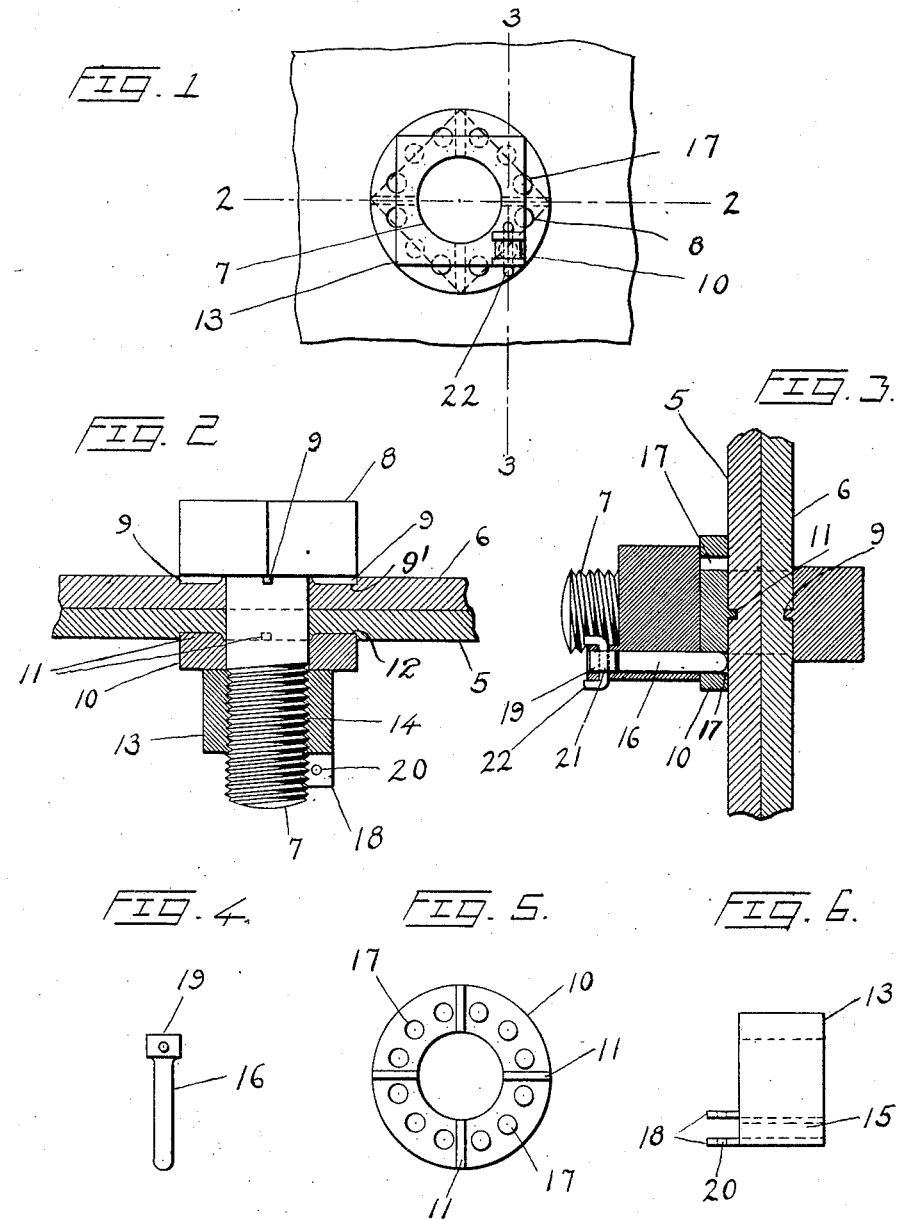
Witnesses
P. M. Hunt
F. O. Fowler
Inventor
Bernard Wich.
By Victor J. Evans
Attorney

UNITED STATES PATENT OFFICE.

BERNARD WICH, OF MECHANICSVILLE, NEW YORK.

NUT-LOCK.

1,055,961. Specification of Letters Patent. Patented Mar. 11, 1913.

Application filed May 3, 1912. Serial No. 694,910.

*To all whom it may concern:*

Be it known that I, BERNARD WICH, a citizen of the United States, residing at Mechanicsville, in the county of Saratoga and State of New York, have invented new and useful Improvements in Nut-Locks, of which the following is a specification.

The invention relates to nut locks and has for its primary object the provision of a safety nut lock in which a bolt and the nut carried thereby will be securely fastened in place without any possibility of either the bolt or nut accidentally working loose or becoming detached from each other, thereby assuring a positive and firm fastener.

Another object of the invention is the provision of a safety nut lock in which a locking pin is adapted for detachable engagement in a washer, the pin being carried by the nut which is engaged with the bolt in the usual well-known manner, and in this manner the said nut and also the washer will be held fast to prevent the loosening thereof, the bolt being formed on its head with locking lugs engageable with the work, so as to avoid the turning of the bolt, thus affording a fastener which will securely hold the work and also one that possesses simplicity and a minimum number of parts.

A further object of the invention is the provision of a safety nut lock which is simple in construction, strong, durable, thoroughly reliable and efficient in its purpose, and inexpensive in manufacture.

With these and other objects in view the invention consists in the construction, combination and arrangement of parts as will be hereinafter more fully described, illustrated in the accompanying drawing, and pointed out in the claim hereunto appended.

In the drawing:—Figure 1 is an end elevation of a lock constructed in accordance with the invention showing the same applied to a piece of work. Fig. 2 is a sectional view on the line 2—2 of Fig. 1. Fig. 3 is a sectional view on the line 3—3 of Fig. 1. Fig. 4 is a side elevation of the locking pin. Fig. 5 is a plan view of the washer. Fig. 6 is an edge elevation of the nut.

Similar reference characters indicate corresponding parts throughout the several views in the drawing.

Referring to the drawings by numerals 5 and 6 designate fragmentary portions of adjacent plates adapted to be secured in and through which is passed a bolt member 7 provided with a wrench engaging head 8, although the latter may be circular shaped or of any other desirable shape and is formed at its inner face with radially disposed locking lugs or ribs 9 adapted to engage in correspondingly shaped grooves or counter seats 9′, formed in the outer face of the plate 6 and in this manner the bolt member 7 will be prevented from turning when engaged in the plate. Surrounding the shank of the bolt member 7 and contacting with the outer face plate 5 is a circular-shaped washer 10, the same being formed on its inner face with radially disposed inwardly projecting locking lugs or ribs 11, which are adapted to engage in correspondingly shaped grooves or seats 12 formed in the outer face of the plate 5, so as to prevent turning of the washer 10 upon the shank of the bolt member on the application of the nut hereinafter described.

The nut comprises a square shaped body 13 having a threaded central aperture 14 as usual for engaging the threads of the shanks of the bolt members 7 for the adjustment of the nut thereon in the ordinary well-known manner. Formed near one corner of the body and extending transversely therethrough is a lock key or pin receiving opening 15 in which is removably inserted a locking key or pin 16, the same being of a length to engage in any one of a series of openings 17 formed transversely in the washer 10 concentrically with respect to its center, the openings 17 being arranged in spaced relation to each other and on the engagement of the said key or pin 16 with the said washer the nut body 13 will be locked upon the shank of the bolt member.

Formed on and projecting from the outer face of the body 13 of the nut at opposite sides of the opening 15 therein are parallel ears 18 between which is engaged the perforated head 19 of the pin or key 16, the perforation in the said head 19 being adapted to register with alining openings 20 formed in the ears 18 and in these openings 20 and the perforation in the head 19 is engaged a locking wire 21, the ends of which are out-turned to provide abutment terminals 22, working against the outer faces of the ears 18, so as to avoid the detachment of the wire 21 when locking the pin or key 16 in the nut 13 and the washer 10 to prevent the working loose thereof.

From the foregoing description, taken in connection with the accompanying drawing, it is thought that the construction and operation of the invention will be clearly understood, and therefore, a more extended explanation has been omitted.

What is claimed is:—

The combination with a nut, of a locking member slidably fitted within the nut and adapted for engagement with a fixed part to prevent the turning of the nut, ears integrally formed with the nut and projecting from the outer face at opposite sides of the sliding member, a perforated head formed on the sliding member and having opposed flat faces working against the inner sides of the ears to prevent the turning of the sliding member in the nut, and a wire like member passed through the perforated head and engaged in the ears for locking the sliding member in the nut.

In testimony whereof I affix my signature in presence of two witnesses.

BERNARD WICH.

Witnesses:
 FRED. M. EAMES,
 O. F. LEWIS.

Copies of this patent may be obtained for five cents each, by addressing the "Commissioner of Patents, Washington, D. C."